Feb. 20, 1962 W. PFERD 3,022,381
CREDIT CARD OPERATED TELEPHONE
Filed Feb. 26, 1959 2 Sheets-Sheet 1
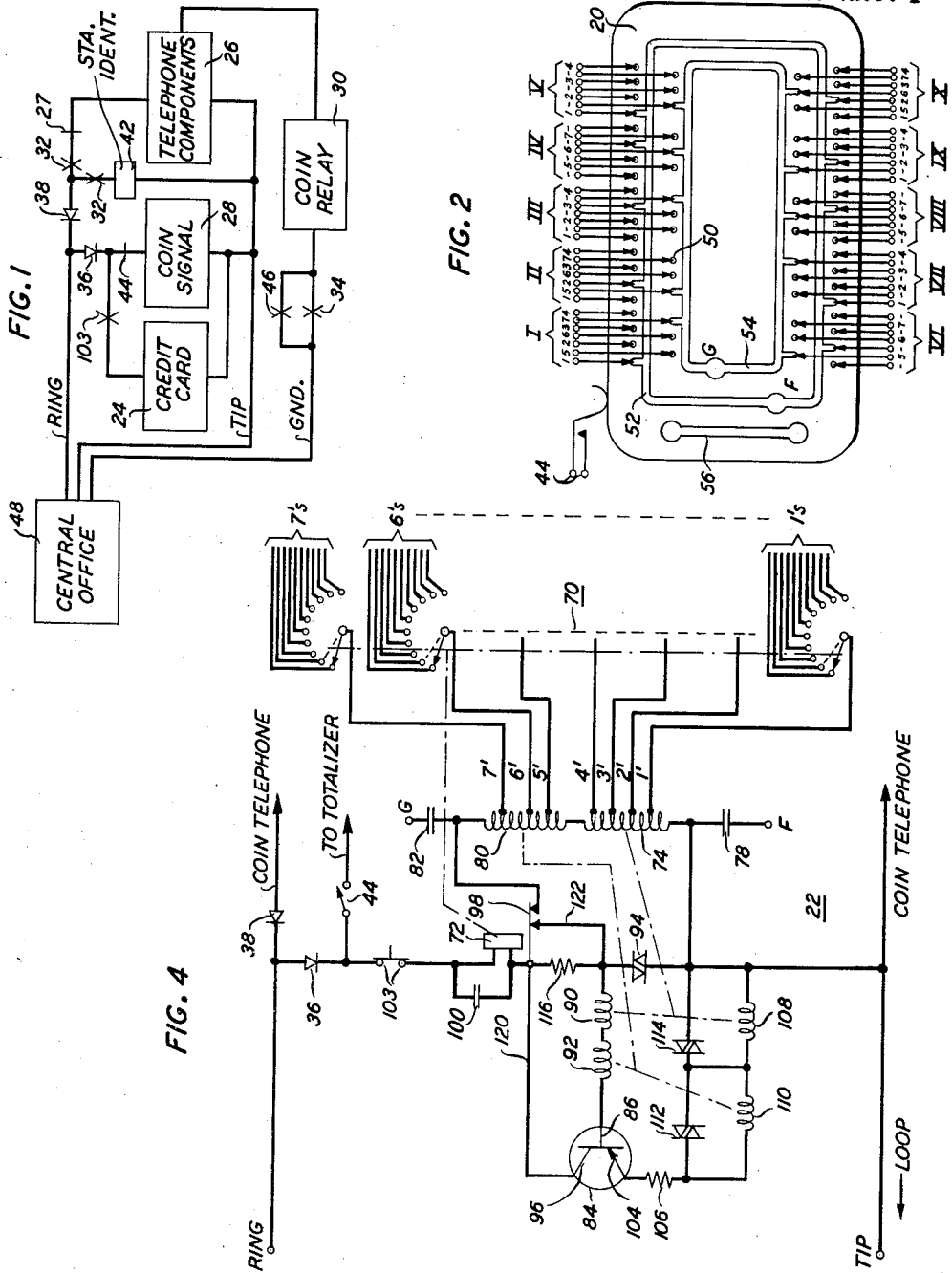
INVENTOR
W. PFERD
BY J.C. Redmond Jr.
ATTORNEY Feb. 20, 1962     W. PFERD     3,022,381
CREDIT CARD OPERATED TELEPHONE
Filed Feb. 26, 1959     2 Sheets-Sheet 2
FIG. 3
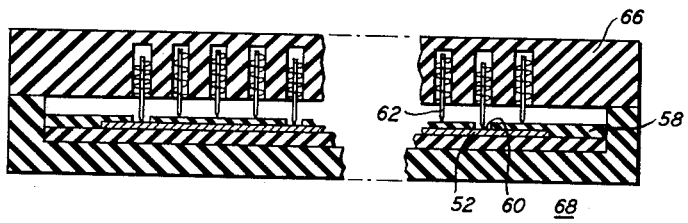
FIG. 5
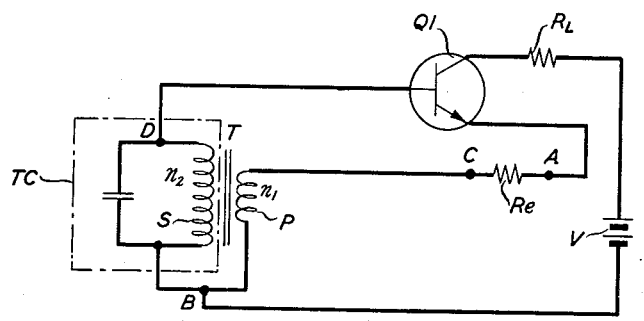
FIG. 6A     FIG. 6B     FIG. 6C
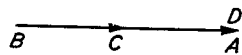  
INVENTOR
W. PFERD
BY J.C. Redmond, Jr.
ATTORNEY United States Patent Office 3,022,381
Patented Feb. 20, 1962

3,022,381
CREDIT CARD OPERATED TELEPHONE
William Pferd, Watchung, N.J., assignor to Bell Telephone Laboratories, Incorporated, New York, N.Y., a corporation of New York
Filed Feb. 26, 1959, Ser. No. 795,642
7 Claims. (Cl. 179—6.4)

This invention relates to communications systems and more particularly to publicly or privately operated substation equipment.

In the present day economy, credit cards are finding increased use for the purchase of goods and services. Telephone companies have for some time made available credit cards and the number of cards as well as the volume of traffic originating therefrom is ever increasing. The calling procedure connected with the use of a card, however, is relatively slow as compared to the normal dialing procedure since the card holder is required to transfer orally the credit card number to an operator before the call is placed by the operator or dialed by the customer. With an increasing number of calls to be placed in the future by credit card holders, it is desirable from both the customer and company standpoints to mechanize the process for using credit cards thereby facilitating telephone service to the customer and producing operating economies to the company.

A general object of the invention is improved telephone service for holders of telephone credit cards.

A more particular object of the invention is mechanized operation for charging and billing telephone calls made by holders of telephone credit cards.

Another object of the invention is personalized and fraud proof telephone credit card operation for local or toll services.

According to one feature of the present invention a card of suitable material is encoded with a subscriber account number, the card being adapted to activate public or private substation apparatus for either local or toll calling.

Another feature of the present invention is means for translating a subscriber account number encoded on a credit card into analogous electric signals which are employed by means at a central office to time and charge the use of substation apparatus to the credit card holder.

According to still another feature of the present invention, substation apparatus includes means for reading each digit of a subscriber account number encoded in a credit card and controlling a signal generator means to produce electric signals analogous to each digit of the encoded subscriber account number.

One specific feature of the present invention is a credit card of suitable material having printed circuitry thereon in the form of contact points and conductive loops, the contact points being arranged in a plurality of groups, each group being a coded representation of a digit in a subscriber account number assigned to the card.

Another specific feature of the present invention is a signal generator having at least two tank circuits, one tank circuit adapted to produce four different tuned frequencies and the other tank circuit adapted to produce three frequencies different from themselves and from the frequencies in the first tank circuit, and means including a stepping switch for selecting from each tank circuit one frequency in accordance with each digit of a subscriber account number encoded in a credit card.

In an illustrative embodiment, the present invention comprises a card of suitable material having printed circuitry thereon in the form of coded representations of each digit of a subscriber account number. The card is adapted to activate public or private substation apparatus for dialing purposes. The substation includes station identification means and is connected to a central office including automatic message accounting apparatus which stores the dialed call and activates translation means also included in the substation. When activated, the translation means reads each digit of the subscriber account number encoded in the credit card and translates the digits sequentially into analogous electrical signals which are transmitted to the automatic message accounting apparatus. The transmitted electrical signals are converted into a subscriber account number by the accounting apparatus, the number being recorded after the apparatus determines that the account number is proper. After recordation, the apparatus completes the stored call and times and charges the use of the substation to the subscriber account number.

These and other objects and features of the present invention will be more fully apprehended from the following detailed specification taken in conjunction with the appended drawing in which:

FIG. 1 is an electrical schematic representation of a pay station employing the principles of the present invention;

FIG. 2 is a plan view of an encoded credit card and sensing means employed in the present invention;

FIG. 3 is an elevational view of a credit card holder included in a substation for receiving the credit card of FIG. 2;

FIG. 4 is an electrical schematic representation of translation means included in substation apparatus of the present invention for translating the encoded credit card of FIG. 2 into analogous electrical signals;

FIG. 5 is an electrical schematic diagram of a simplified form of signaling circuit of this invention; and FIGS. 6A, 6B, and 6C are phase diagrams of the circuit of FIG. 5.

Referring to FIGS. 1, 2, and 4, the present invention comprises credit card apparatus 24 including a subscriber identification means or credit card 20 and a translation means 22 which may be employed with either a standard subscriber apparatus (not shown) or a conventional pay station (not shown), the housing of the apparatus or pay station being adapted to include the translation means and to receive the credit card in a manner similar to that suggested in United States Patent 1,927,556 to M. L. Nelson, issued September 19, 1933. In both the pay station and subscriber apparatus, the subscriber identification means and the translation means are connected at the station to be across the tip and ring lines serving the station as shown by the credit card apparatus 24 of FIG. 1, which is a schematic circuit digaram of a conventional pay station. Included in the pay station are telephone components 26, dial contacts 27, a coin signal 28, a coin relay 30, switchhook contacts 32, and hopper trigger contacts 34, all of the foregoing apparatus being of conventional design. The substation also includes diodes 36 and 38 for purposes of isolating the credit card and coin signal equipment as will be explained hereinafter in more detail. The switchhook contacts 32 of the pay station are paralleled by a station identifier means 42 which is adapted to produce a distinctive identifying tone when the switchhook contacts are closed. An example of a station identifier means is disclosed in my previously filed application Serial No. 691,344, filed October 21, 1957 and entitled "Transistor Oscillator Identifier for Communication Systems." The substation has credit card operated contacts 44 and 46, the former, when opened, disconnecting the coin signal 28 from the station and the latter, when closed, bypassing the hopper trigger contacts 34 to connect the station to a central office 48 having automatic message accounting apparatus (not shown) therein. The accounting apparatus employed in the present invention is disclosed in several articles which appeared in the Bell Laboratories Record among which are "Basic AMA Central Office Features" by D. H. Pennoyer at page 454 of the October 1951 issue and "No. 5 Cross Bar Translators" by T. L. Dimond at page 62 of the February 1951 issue.

Except for the coin signal 28, the coin relay 30, and hopper trigger contacts 34, the subscriber circuit diagram (not shown) is the same in structure and operation as that of FIG. 1. It is believed, therefore, that a complete disclosure of the operation and structure of FIG. 1 will enable a person skilled in the art to make and use either the pay station or subscriber apparatus of the present invention.

The credit card 20 employed in the credit card apparatus 24 of FIG. 1 is shown in more detail in FIG. 2. The card is a printed circuit board, the composition and size thereof being adapted for durability and ease of customer handling. To prevent the charging of telephone calls by unauthorized cards, the printed circuitry on the card is arranged to form coded representations of each digit of a subscriber account number assigned to the card. The coding may, of course, be in any number of forms, but in a preferred embodiment each digit of the subscriber account number is represented by corresponding groups I, II, III . . . X of contacts 50, each group of contacts having the same number therein and further subdivided into first and second parts of four and three contacts, respectively. For convenience the contacts of the first part are numbered 1 through 4 whereas the contacts of the second part are numbered 5 through 7. Associated with the contacts 1 through 4 is a conductive loop 52 with one contact in the first part of each group being connected to the loop. Similarly, a second conductive loop 54 is associated with the second part of each group, one contact in the second part of each group being connected to the loop. Since each digit of the subscriber account number may be represented by any number from zero to nine, it is believed apparent to a worker skilled in the art that two out of seven possible connections for each group will adequately represent any number of a digit in the subscriber account number. For purposes of activating the translation apparatus 22 (see FIG. 4), the card 20 includes a conductive strip 56 which, as will be explained hereinafter, engages the circuitry of the translation apparatus to place it into operation. To protect the coding from tampering, a covering mask 58 of plastic sheet is welded or glued to the printed circuit board as shown in FIG. 3. The two connected contacts of each group, however, are exposed by holes 60 in the mask, the holes enabling the contacts to be engaged by sensing equipment for reading the subscriber account number.

The sensing means comprises a plurality of spring-loaded fingers 62 which are positioned in the lid 66 of a card holder 68 suitably mounted in the pay station (not shown). The number of fingers positioned in the lid corresponds to the number of contacts 50. Additional fingers are also included in the lid to contact each conductive loop and the conductive strip 56. The sensing fingers are connected electrically to a conventional stepping switch 70 (see FIG. 4) having a plurality of levels therein, the number of levels corresponding to the number of contacts 50 in each encoded group of the printed circuit card 20. The stepping switch is a ten point device which is driven by a stepping winding 72 shown in FIG. 4 as being connected across the ring and tip lines. Each point of a level is connected to corresponding contacts in each group. Thus, for example, the first level of the switch is connected to the contact labelled 1 in each group whereas the 7th level of the switch is connected to the contact labelled 7 in each group. The electrical connection between the stepping switch and the sensing fingers enables the switch, as it steps from point to point, to read simultaneously the contacts in each group. This may be illustrated by referring to FIG. 4 where it will be seen that in the first position of the stepping switch each level thereof is connected to a contact 50 of the I or first group of contacts.

Associated with the stepping switch is a signal generator having two tank circuits, the first circuit including an inductance 74 which is tapped at four different points 1′, 2′, 3′, and 4′ and a capacitor 78. The four tapped points of the inductance 74 are connected to the movable contacts of the 1st, 2nd, 3rd, and 4th levels of the stepping switch. The capacitor 78 is connected to the sensing element (not shown) which connects to the conductive loop 52. The second tank circuit of the signal generator includes an inductance 80 which is tapped at three different points 5′, 6′, and 7′ and a capacitor 82. The tapped points of the inductance 80 are connected to the movable contacts of the 5th, 6th, and 7th levels of the stepping switch and the capacitor 82 is connected to the conductive loop 54. In this arrangement it will be seen that as the movable contacts of the switch 70 move from the first to the tenth point various amounts of inductance in each tank circuit will be combined with the capacitor therein according to the coding of the printed circuit board. For example, in the position of the movable contacts shown in FIG. 4 the inductance of the tap point 1′ of the first tank circuit is combined with the capacitor 78 whereas the inductance of the tap point 7′ of the second tank circuit is combined with the capacitor 82. In the next position of the movable contacts, shown by the dotted lines, the inductance of the tap point 2′ of the first tank circuit is combined with the capacitor 78 whereas the inductance of the tap point 5′ of the second tank circuit is combined with the capacitor 82.

The tank circuits are coupled electromagnetically to a transistor amplifier 84 including a base electrode 86 connected through a series of windings 90 and 92 and an impedance limiting device 94 to the tip side of the telephone line. A collector electrode 96 is connected through the stepping winding 72, contacts 103, and the diode 36 to the ring side of the telephone line. A capacitor 100 parallels winding 72 for tuning the operation of the stepping switch 70. A bias resistor 116 is connected between the base and collector electrodes, the resistor serving to pass current through the device 94 to establish its normally conducting voltage. An emitter electrode 104 includes emitter resistor 106 and a pair of series windings 108 and 110 which are connected to the side of the impedance limiting device 94 connected to the tip line. The emitter circuit windings are shunted individually by impedance limiting devices 112 and 114 which serve to regulate the amplitudes of the voltages across the emitter windings 108 and 110. The impedance limiting devices 94, 112, and 114 are preferably each a pair of oppositely poled parallel-connected Western Electric type 420 B varistors which exhibit a high resistance up to 0.7 volt peak amplitude above which the resistance falls rapidly.

The transistor oscillator is powered over the telephone line and the emitter bias is obtained through the voltage drop across the impedance limiting device or varistor 94. The single transistor is the only active element in the circuit and in actuality is a linear amplifier, the oscillations in each tank circuit enabling the amplifier to generate a pair of voice frequency transients as will be hereinafter described. The amplitude regulation of oscillation is achieved through a unique characteristic of the feedback path rather than any nonlinear characteristics of the transistor itself.

An understanding of the operation of the transistor circuit may be had on consideration of its simplified form shown in FIG. 5. The oscillator of FIG. 5 comprises a transistor $Q_1$ with a tuned circuit TC in its base lead and the emitter lead including a resistor $R_e$ and a winding P coupled to coils of the tuned circuit TC. A battery V and a load resistor $R_L$ complete the simplified circuit. With this arrangement, a portion of the output of the transistor $Q_1$, as determined in part by the magnitude of the resistor $R_e$, is returned to the base lead by the transformer action of the coupled windings P and S. Since an emitter follower configuration exists, the voltage gain of the amplifier is essentially unity and the voltage or turns ratio $n_2/n_1=K$ of the coupled windings P and S must exceed unity to provide a return of energy to the base circuit of the transistor $Q_1$. If K is made equal to 2, the transformer coupling is ideal, and the amplifier has a voltage gain of 1 with a phase shift $\theta$ of 0, then to make $\mu\beta=1/\underline{0°}$ at resonance, that is, to meet the requirement for critically sustained oscillations, the emitter resistor $R_e$ must have a value equal to $R_{n1}$ where $R_{n1}$ is the resonant resistance of the transformer at the terminals of the winding P.

The voltage vector diagram for this condition, with vectors designated in accordance with the capital letters of FIG. 5, is shown in FIG. 6A while FIG. 6B shows the vector diagram with a phase shift of zero, but with the amplifier voltage gain less than 1 and $R_e$ sufficiently less than $R_{n1}$ to make $\mu\beta=1$. Vector AD, the difference between the voltages BD and BA, is the base-emitter or input voltage of the amplifier and BA is the output voltage. FIG. 6C adds an inherent amplifier phase shift $\theta$ to the conditions of FIG. 6B. It will be noted from FIG. 6C that the phase shift $\Phi$, required of the tuned circuit to make $\mu\beta=1/\underline{0°}$, is much less than $\theta$. Here it should be noted that there is equivalence between the vector diagrams of FIGS. 6A, B and C and those for the bridge stabilized oscillator of L. A. Meacham, described in the Bell System Technical Journal, vol. 18, pp. 574–590, October 1938, and hence that the stability characteristics are analogous.

Automatic maintenance of $\mu\beta=1$ is achieved in the Meacham oscillator by using a thermally variable resistance as one arm of the bridge. The comparable element in FIG. 5 is resistor $R_e$ which could be similarly used to control $\mu\beta$. However, a problem is posed by the necessity of separating the alternating and steady components of the emitter current since only the alternating component is wanted for the control of gain. Further, since it is desired to employ the amplifier for the simultaneous generation of two frequencies, two tuned circuits are involved and the control of $R_e$ cannot simultaneously control $\mu\beta$ for both circuits. Therefore the use of $R_e$ as a gain control is abandoned in favor of a voltage-critical resistor shunting a section of the tuned transformer, such as $n_2$. This resistor varies the Q of the coil and hence the gain of the tuned circuit. A suitable resistor is a silicon junction varistor which has the characteristic of an extremely high resistance up to a voltage of about 0.7 at which the resistance falls rapidly. With this element, by choosing $R_e$ so that $\mu\beta$ is only slightly greater than 1 and properly designing the coil, good gain control is attainable without serious deterioration of Q.

The essential connection for two-frequency oscillation is shown in FIG. 4. Two separately tuned transformers made up of the inductances 74, the windings 90 and 108 and the inductances 80, the windings 92 and 110 are connected with corresponding windings in series to replace the single tuned transformer of FIG. 5. Non-linear elements 112 and 114 are the varistors employed as amplitude control. Dual oscillation is possible because no form of amplifier overloading is used for amplitude limiting and hence the amplifier is operated as a linear device capable of supplying energy to the two tuned circuits as well as to the bias resistor 116 and the line.

The switch 98 which is operated by the stepping winding 72 and connected in the collector circuit serves: (1) to enable the oscillator by breaking the path through 120 and 122 leads which normally short-circuit the oscillator except for the low impedance of the varistor 94; and (2) to interrupt the direct current flowing through the tank circuits due to the voltage across the varistor 94. The function (2) instantaneously starts the oscillation of the tuned coils which is sustained by the oscillator circuit, thereby avoiding a build-up time for the oscillator.

Having described the structure of the present invention, the remaining paragraphs of the specification will be devoted to the operation of the invention. The operation proceeds by the customer lifting the handset of the station, the switchhook contacts 32 being closed to complete the circuit through the telephone components 26. Next the customer inserts the encoded credit card 20 into the card holder 68 and closes the lid 66 thereto. Two of the sensing fingers 62 engage the conductive strip 56 and are connected to the contacts 103 which when closed by the strip 56 place the translation and sensing means across the tip and ring lines. Inserting the card into the card holder, operates the contacts 44 and 46 in the manner suggested in FIG. 2 to disconnect the coin signal 28 and bypass the hopper trigger contacts 34, respectively. The closing of the contacts 46 places battery of selected polarity and dial tone across the ring and tip lines which enables the customer to dial the desired number. The diode 36 is poled in opposition to the selected battery polarity and thereby disconnects or isolates the credit card apparatus from the ring line. During the dialing process the station identifier 42 generates a distinctive signal which the automatic message accounting apparatus recognizes as being from a credit card station. The accounting apparatus thereafter holds the dialed number and reverses the polarity of the battery which disconnects the telephone components 26 from the line due to the diode 38 which is poled in the opposite direction to the reverse polarity. The credit card apparatus of the present invention, however, due to the poling of diode 36 is placed across the ring and tip lines and pulsed by the accounting apparatus. The stepping switch winding 72 thereupon rotates the movable contacts of each level causing each group of contacts on the encoded credit card to be sensed. The coded groups as mentioned before select particular inductances and/or frequencies of the tank circuits of the signal generator, the frequencies being applied to the transistor amplifier 84 as previously mentioned. The combined two frequencies for each group are analogous to the encoded digit of the subscriber account number and the series of analogous two-frequency signals are transmitted to the accounting apparatus. On receipt of the two-frequency signals, the accounting apparatus converts the signals into a subscriber account number which is thereupon recorded after it is determined that the account number is proper. The account number being recorded, the accounting apparatus then proceeds to complete the call to the desired station and to reverse the polarity of the battery which enables the talking circuit of the pay station. The accounting equipment thereafter times and charges the use of the station to the subscriber account number for either a local or toll call.

In the event that the account number is not proper, the customer is connected to an operator or other means may be included in the station to prevent any further use thereof.

It can be appreciated that the above-described arrangements are merely illustrative of the principles of the invention. Numerous other arrangements and modifications may be devised by those skilled in the art without departing from the spirit and scope of the invention.

What is claimed is:

1. A credit card operated telephone station comprising a card of suitable material having printed circuitry thereon which forms coded representations of each digit of a subscribed account number, substation apparatus adapted to be activated by said card, means included in said substation apparatus for sensing the encoded digits of the subscriber account number, signal generator means adapted to produce simultaneously two different frequencies, a stepping switch for inspecting the sensing means and in accordance with the coding on the card selecting two frequencies for each digit of the account number as an output of the generator, the output of said signal generator being supplied to a central office.

2. A credit card operated telephone station comprising a card of suitable material having printed circuitry thereon in the form of a plurality of contacts and conductive loops, the contacts being arranged in a selected number of groups, at least two contacts of each group being connected to conductive strips and forming a code representation of a number in a subscriber account number, substation apparatus adapted to be activated by said card, said substation apparatus including means for sensing the contacts in the encoded groups, corresponding sensing elements of each group electrically connected to the same level of a multi-level stepping switch, a signal generator having at least two multi-tapped tank circuits, each tapped point of the circuits being a different tuned frequency and connected to a different level of the stepping switch, the stepping switch inspecting the sensing means and in accordance with the coding on the card selecting two frequencies for each digit of the code as an output of the generator, the output of said signal generator being supplied to a central office.

3. A credit card operated telephone station comprising a card having printed circuitry thereon in the form of a plurality of contacts and conductive loops, the contacts being arranged in a selected number of groups, at least two contacts of each group being connected to the conductive loop and forming a code representation of a number in a subscriber account number, an insulated covering on the printed circuitry except for the two contacts in each group connected to the conductive loops, substation apparatus including sensing means for engaging the contacts and the conductive loops, said substation adapted to be activated by said card, a signal generator having at least two multi-tapped tank circuits, each tapped point of the circuits being a different tuned frequency of the signal generator, means including a stepping switch for selecting in accordance with the coding of the card as an output of the generator a frequency in each tank circuit per digit of the account number, the output of said signal generator being supplied to a central office.

4. A credit card operated public telephone station comprising a card having printed circuitry thereon in the form of a plurality of contacts and conductive loops, the contacts being arranged in a selected number of groups, each group encoded with a digit of a subscriber account number by at least two contacts out of seven contact points being connected to different conductive loops, an insulated covering on the printed circuitry except for the contacts in each group connected to the conductive loops, substation apparatus including station identification and sensing means which engage the contacts and the conductive loop, said substation adapted to be activated by said card; a signal generator having at least two tank circuits, one circuit having tapped points for at least three different frequencies, another circuit having tapped points for at least four different frequencies, all seven frequencies being different from each other; and means including a stepping switch for selecting in accordance with the coding of the card as an output of the generator two frequencies per digit of the account number, one frequency being selected from one circuit and the second frequency being selected from the other circuit, the output of said signal generator being supplied to a central office.

5. In a credit card operated telephone station comprising substation apparatus and means for receiving a card having circuitry thereon which forms coded representations of each digit of a subscriber account number, means operated by receipt of said card for activating said substation apparatus and connecting said station to a telephone line, means included in said substation apparatus for sensing the encoded digits of the subscriber account number, signal generator means for producing a plurality of discrete frequencies, stepping switch means for inspecting said sensing means and in accordance with the coding on said card selecting a frequency for each digit of the account number as an output of said signal generator means, and means for impressing the output of said signal generator means on said telephone line.

6. A credit card operated telephone station comprising substation apparatus and means for receiving a card having circuitry thereon in the form of a plurality of contact members included in a conductive loop, said contact members corresponding to encoded digits of a subscriber account number, means operated by receipt of said card for activating said substation apparatus and connecting said station to a telephone line, a stepping switch, a signal generator including a plurality of individual tuning circuits and output means, said tuning circuits comprising individual terminals and a common terminal, each of said individual terminals when connected to said common terminal producing a discrete frequency, said stepping switch comprising a plurality of levels and an individual wiper member associated with each level, means for sensing the encoded digits of the subscriber account number and connecting the contact members corresponding to a discrete digit to an individual level of said stepping switch, means for connecting said common terminal to said conductive loop, means for connecting said individual terminals to individual wiper members, means energized on activation of said substation apparatus to cause said wiper members to scan said levels and successively connect through said conductive loop said common terminal of said tuning circuits to the individual terminals thereof corresponding to the encoded digits of the subscriber account number.

7. A credit card operated telephone station comprising substation apparatus and means for receiving a card having circuitry thereon in the form of a plurality of contact members included in a conductive loop, said contact members corresponding to encoded digits of a subscriber account number, means operated by receipt of said card for activating said substation apparatus and connecting said station to a telephone line, a first switch, a stepping switch, a source of potential, a signal generator including a plurality of individual tuning circuits and output means, said tuning circuits comprising individual terminals and a common terminal, each of said individual terminals when connected to said common terminal producing a discrete frequency, said stepping switch comprising a plurality of levels and an individual wiper member associated with each level, means for sensing the encoded digits of the subscriber account number and connecting the contact members corresponding to a discrete digit to an individual level of said stepping switch, means for connecting said common terminal to said conductive loop, means for connecting said individual terminals to individual wiper members, means energized on activation of said substation apparatus to cause said wiper members to scan said levels and successively connect through said conductive loop said common terminal of said tuning circuits to the individual terminals thereof corresponding to the encoded digits of the subscriber account number, said first switch being actuated by said energized means to connect said tuning circuits to said potential source and disconnect said signal generator output means from said telephone line prior to the connection of said common terminal to an individual terminal and to disconnect said tuning circuits from said potential source and connect said signal generator output means to said telephone line after said common terminal has been connected to said individual terminal.

References Cited in the file of this patent

UNITED STATES PATENTS

| | | |
|---|---|---|
| 1,927,556 | Nelson | Sept. 19, 1933 |
| 2,244,500 | Nyquist | June 3, 1941 |
| 2,564,410 | Schmidt | Aug. 14, 1951 |
| 2,817,824 | Albright | Dec. 24, 1957 |
| 2,846,497 | Kennedy | Aug. 5, 1958 |
| 2,892,048 | Descouvemont | June 23, 1959 |